US006875276B2

(12) United States Patent
Shibayev et al.

(10) Patent No.: US 6,875,276 B2
(45) Date of Patent: Apr. 5, 2005

(54) APPARATUS AND METHOD FOR FABRICATING LAYERED PERIODIC MEDIA

(75) Inventors: Peter Shibayev, Nutley, NJ (US); Victor Il'ich Kopp, Flushing, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 208 days.

(21) Appl. No.: 10/172,119

(22) Filed: Jun. 14, 2002

(65) Prior Publication Data

US 2002/0196399 A1 Dec. 26, 2002

Related U.S. Application Data

(60) Provisional application No. 60/298,566, filed on Jun. 15, 2001, and provisional application No. 60/298,567, filed on Jun. 15, 2001.

(51) Int. Cl.[7] .............................................. B05C 11/02
(52) U.S. Cl. .......................................... 118/52; 118/412
(58) Field of Search ............................. 118/52, 56, 412, 118/416, 642, 66, 415, 407

(56) References Cited

U.S. PATENT DOCUMENTS

| 4,258,647 A | * | 3/1981 | Pohl et al. |
| 4,358,470 A | * | 11/1982 | Rasmussen |
| 5,095,848 A | * | 3/1992 | Ikeno |
| 5,919,520 A | * | 7/1999 | Tateyama et al. |

* cited by examiner

*Primary Examiner*—Brenda A. Lamb
(74) *Attorney, Agent, or Firm*—Edward Etkin, Esq.

(57) ABSTRACT

An apparatus and method for fabricating a thin layer periodic structure by successively depositing alternating uniform layers of two or more different dielectric materials on a substrate utilizing centrifugal force in a novel spin coating technique. In an alternate embodiment of the present invention, the novel spin-coating technique is configured for fabricating chiral media by successively depositing layers of one or more anisotropic materials, while rotating the substrate by a predetermined angle between deposition of each layer. In both embodiments of the inventive apparatus, a defect layer may be introduced by depositing a defect material in a desired position in the media.

16 Claims, 10 Drawing Sheets

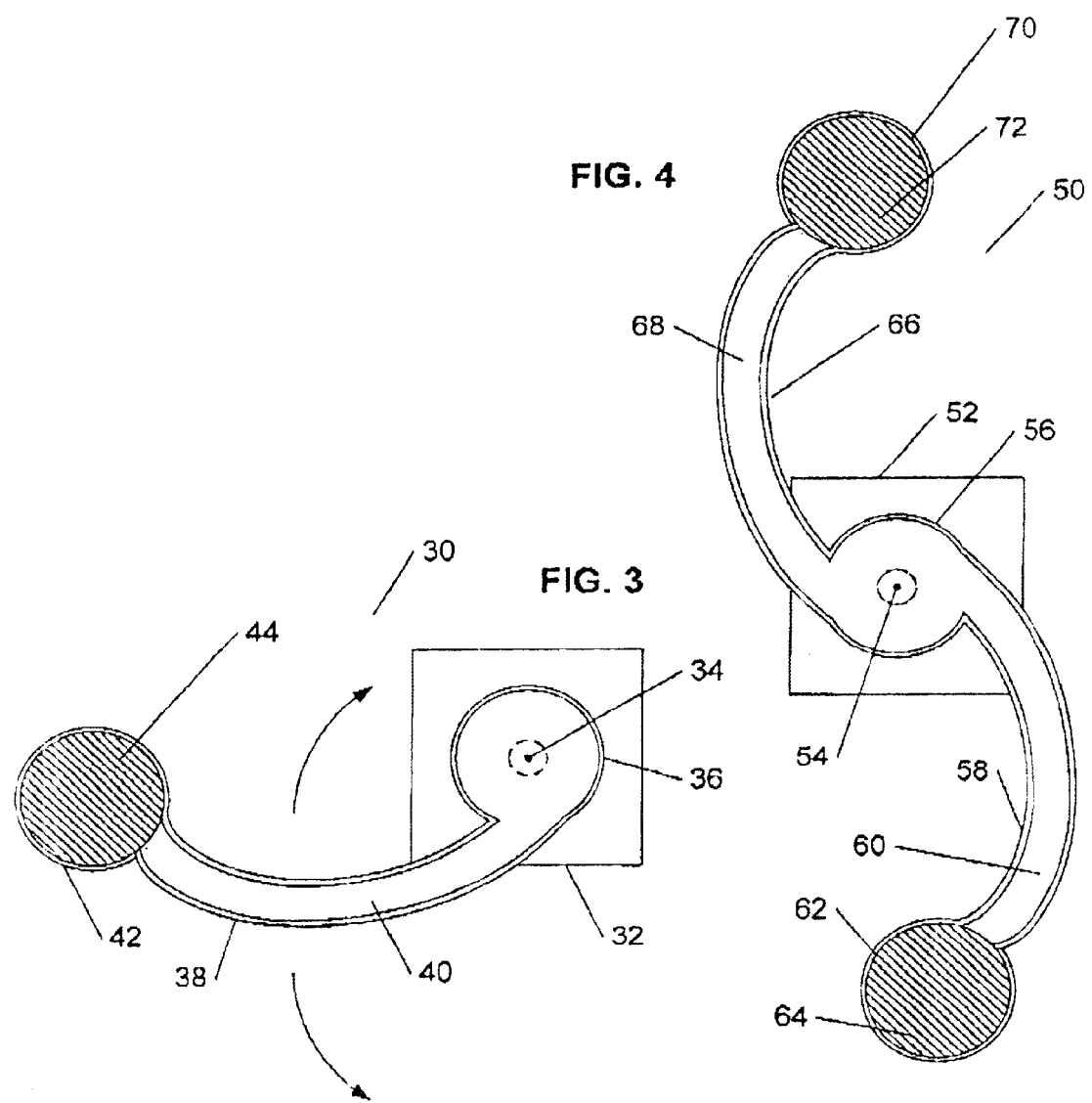

APPARATUS AND METHOD FOR FABRICATING LAYERED PERIODIC MEDIA

CROSS REFERENCE TO RELATED APPLICATIONS

This application claims priority from the commonly assigned U.S. provisional patent application Ser. No. 60/298,566 entitled "Apparatus and Method for Fabricating Layered Periodic Media" filed Jun. 15, 2001, and also from the commonly assigned U.S. provisional patent application Ser. No. 60/298,567 entitled "Apparatus and Method for Fabricating Chiral Media" filed Jun. 15, 2001.

FIELD OF THE INVENTION

The present invention relates generally to thin layered periodic structures, and more particularly to manufacturing superior thin layered periodic structures including superior chiral structures.

BACKGROUND OF THE INVENTION

Thin layered periodic structures are utilized in a wide range of optical devices such as for example: lasers, filters, multiplexers, and amplifiers. Such devices are used in a variety of commercial and industrial applications that include information processing, telecommunication systems, and optical fiber based devices. However, manufacturing of thin layered periodic media is not a continuous process and is prone to undesirable defects and production problems. Furthermore, true chiral materials, such as cholesteric liquid crystals, are very difficult to produce. Finally, the equipment necessary to fabricate thin layer periodic structures is complex and expensive.

It would thus be desirable to provide an advantageous system and method for manufacturing high quality thin layered periodic structures and chiral structures with configurable parameters and at a reduced cost.

BRIEF DESCRIPTION OF THE DRAWINGS

In the drawings, wherein like reference characters denote elements throughout the several views:

FIG. 3 is a schematic diagram of a top view of a second embodiment of the thin layered periodic media fabrication apparatus of the present invention;

FIG. 4 is a schematic diagram of a top view of a third embodiment of the thin layered periodic media fabrication apparatus of the present invention;

SUMMARY OF THE INVENTION

Figure 1A:
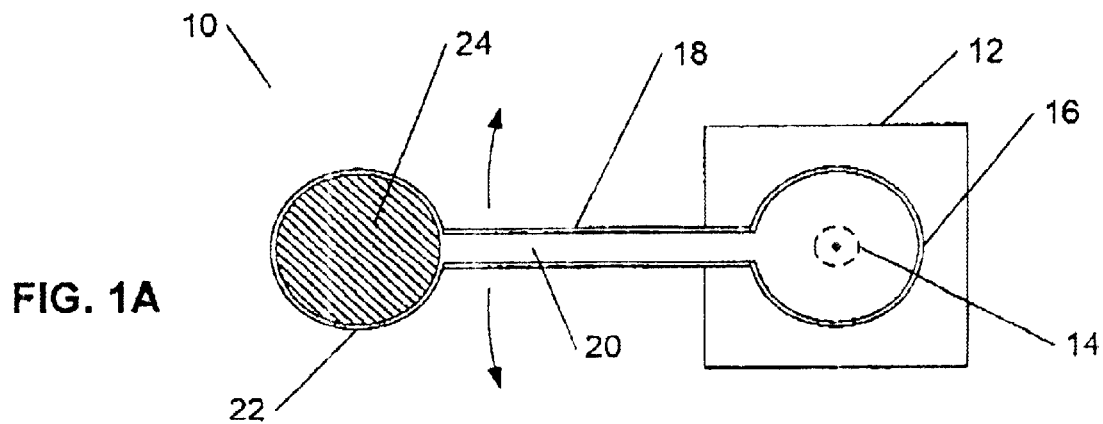
FIG. 1A is a schematic diagram of a top view of a first embodiment of the thin layered periodic media fabrication apparatus of the present invention.

The present invention is directed to an apparatus and method for fabricating a thin layer periodic structure by successively depositing alternating layers of two or more different dielectric materials on a substrate utilizing an inventive spin-coating technique. In an alternate embodiment of the present invention, the inventive spin-coating technique is configured for fabricating chiral media by successively depositing layers of anisotropic material, while rotating the substrate by a predetermined angle between deposition of each layer. In both embodiments of the inventive apparatus, a defect layer may be introduced by depositing a defect material in a desired position in the media.

In summary, in the first group of embodiments, the inventive apparatus includes a receiving vessel for receiving the materials used for fabrication that is mounted on a shaft connected to a drive unit. One or more holding arms are connected to the receiving vessel and extend to a substrate support on which the substrate (on which the material layers are to be deposited) is positioned. One or more channels in each holding arm communicate between the receiving vessel and each substrate support such that when a fabrication material is delivered to the receiving vessel and the drive unit spins the vessel, centrifugal force causes the material to flow from the receiving vessel to the substrate support along the channel(s) and coat the substrate in a thin layer. This procedure is then repeated as two materials are alternated to form a layered periodic structure on the substrate. For thicker media the substrate may be lowered as successive layers are deposited. The materials may be selected such that they do not interact with one another (i.e. do not mix with or dissolve each other), or optionally each layer may be polymerized (for example by subjecting it to ultraviolet light) before the next layer is deposited thereon. Optionally a defect may be introduced into the structure by depositing a layer of a defect material in a predetermined location in the structure during the fabrication process. A variety of advantageous holding arm and channel configurations are shown in the various embodiments described below.

In an alternate embodiment of the present invention, the inventive apparatus may be configured for fabricating chiral media. This is accomplished in a similar manner to the above-described apparatus except that: (1) one or more anisotropic materials are used in the process, and (2) the substrate is rotated by a predetermined angle between deposition of each layer. This techniques advantageously enables fabrication of a chiral structure. Optionally, a defect can be introduced into the chiral structure in one of two ways—by changing the angle between the layers to a value sufficient to form the defect in the structure (e.g. 90 degrees), or by depositing a layer of a defect material layer in a predetermined location in the structure during the fabrication process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to an apparatus and method for fabricating thin layered periodic film and chiral structures by utilizing a specially configured spin coating apparatus. Thin layered periodic and chiral media are utilized in a variety of applications such as disclosed in commonly assigned U.S. Pat. No. 6,404,789 entitled "Chiral Laser Apparatus and Method". Spin coating techniques are well known in the art, however they have not been effectively utilized in the fabrication of thin layered periodic media or in fabrication of chiral media. The apparatus of the present invention advantageously enables simplified and inexpensive fabrication of thin layered periodic media as well as chiral media.

Figure 1B:
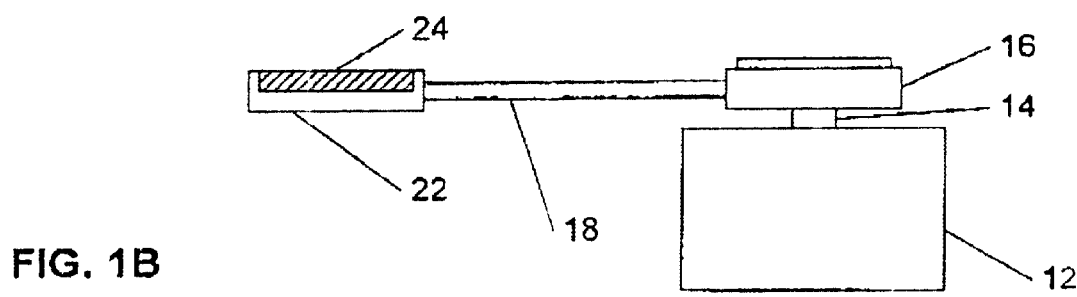
FIG. 1B is a schematic diagram of a side view of a first embodiment of the thin layered periodic media fabrication apparatus of the present invention.

Referring to FIGS. 1A and 1B, a first embodiment of the fabrication apparatus 10 of the present invention is shown. The apparatus 10 includes a drive unit 12, for example a motor capable of operation over a wide RPM range, for driving a shaft 14. The shaft 14 is connected to a receiving vessel 16 with a central cavity for receiving materials to be used for layering. A holding arm 18 with a shallow channel 20 connects the receiving vessel 16 cavity to a substrate support 22. The substrate support 22 is configured for holding a substrate 24 upon which the periodic layers are to be deposited during the operation of the apparatus 10. The receiving vessel 16, the channel 20 and the substrate support 22 are configured such that when the drive unit is activated and the shaft 14 begins rotation, a first material deposited into the receiving vessel 16 is driven, by the centrifugal force caused by the shaft 14 rotation, through the channel 20 onto the substrate 24. The centrifugal force causes the first material to easily and uniformly coat the substrate.

After the first material has been deposited to form the first layer, a second material is directed into the receiving vessel 16 and flows through the channel 20 onto the substrate 24 to form a second layer over the layer formed by the first material. To prevent the second material from mixing with the previously deposited first material, the first and second materials should be selected such that they cannot dissolve or mix with one another. The process may then be repeated by depositing another layer of the first material, or alternately, a third material may be used as desired. Preferably, the materials are delivered to the receiving vessel 16 when the apparatus 10 is in operation. However, as a matter of design choice, the materials may be delivered to the receiving vessel 16 when apparatus is at a stopped mode. In order to assure the desired layer thickness, preferably the first and second materials are delivered in carefully measured quantifies such that only enough material to form each layer is delivered. Optionally, if a structure with a defect is desired, a defect layer can be formed within the layered structure by depositing a defect material, selected as a matter of design choice, as one of the layers during the above described operation in a desired position within the structure. For example, the defect material may be either the first or the second material so that a thicker layer (that serves as a defect layer is formed. It should also be noted, that while the various embodiments are described with reference to using two dielectric materials, more than two different materials may be utilized without departing from the spirit of the invention to form a layered structure with multiple sets of periodic layers (e.g. material 1, material 2, material 3, material 1, material 2, material 3, etc.).

In accordance with the present invention, the substrates utilized in the various embodiments of the present invention may be constructed of a variety of materials such as glass, ITO (indium thin oxide), silicon or a polymer substance.

The first and second materials utilized in accordance with the embodiments of the present invention of FIGS. 1A to 11 may be selected from water solutions of polymeric acid or dyes, such as toluene. Alternately, the materials may incorporate photo-initiators, emitting substances (such as dyes or rare earths), and can have properties of electro-luminescence and conductivity. While preferably the first and second materials should be selected such that they do not mix or dissolve one another, if the first material is polymerized (for example by UV radiation) before the second material is applied, a pair of any materials may be utilized in accordance with the present invention.

Figure 2:
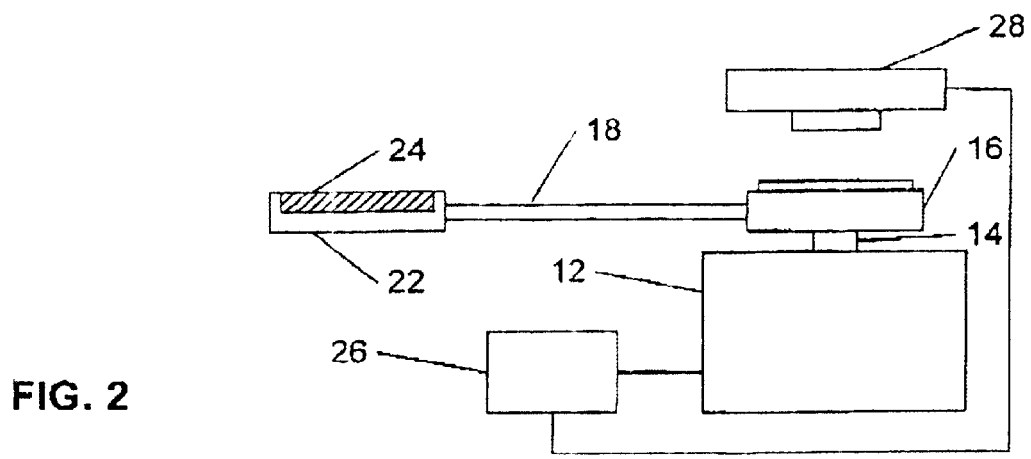
FIG. 2 is a schematic diagram of a side view of an alternate embodiment of the thin layered periodic media fabrication apparatus of the present invention.

Referring now to FIG. 2, an alternate embodiment of the apparatus 10 is shown that includes a material dispenser 28 positioned over the receiving vessel 16 and control unit 26, connected to the material dispenser 28 and the drive unit 12, for controlling the operation of the apparatus 10. In accordance with the present invention, the control unit 26 activates the drive unit 12 to begin rotation of the shaft 14 so as to exert centrifugal force in the direction of the substrate support 22. The control unit 26 first causes the material dispenser 28 to dispense the first material into the receiving vessel 16 so that a first layer is formed on the substrate 24, then causes the material dispenser 28 to dispense the second material into the receiving vessel 16 to form the second layer on the substrate 24, and then repeats the process to form additional pairs of layers. In order to assure the desired layer thickness, preferably the first and second materials are delivered by the material dispenser 28 in carefully measured quantities such that only enough material to form each layer is delivered. If a defect structure is being fabricated, the material dispenser 28 delivers the defect material for layer deposition at the desired position in the structure before resuming delivery of the first and second materials. While the below-described embodiments do not show the control unit 26 or the material dispenser 28, it should be understood that these components may be advantageously utilized in these embodiments and are not shown for the sake of simplicity.

In accordance with the present invention, the shape of the holding arm 18 may be selected as a matter of design choice. Referring now to FIG. 3, a second exemplary embodiment of the apparatus 10 is shown as an apparatus 30. The apparatus 30 includes a drive unit 32, for example a motor capable of operation over a wide RPM range, for driving a shaft 34. The shaft 34 is connected to a receiving vessel 36 with a central cavity for receiving materials. A curved holding arm 38 with a shallow channel 40 connects the receiving vessel 36 cavity to a substrate support 42. The substrate support 42 is configured for holding a substrate 44 upon which the periodic layers are to be deposited during the operation of the apparatus 30. The receiving vessel 36, the channel 40 and the substrate support 42 are configured such that when the drive unit is activated and the shaft 34 begins rotation, a first material deposited into the receiving vessel 36 is driven, by the centrifugal force caused by the shaft 34 rotation, through the channel 40 onto the substrate 44. The centrifugal force causes the first material to easily and uniformly coat the substrate. After the first material has been deposited to form the first layer, a second material is directed into the receiving vessel 36 and flows through the channel 40 onto the substrate 44 to form a second layer over the layer formed by the first material. The curved shape of the holding arm 40 delivers the materials to the substrate 44 at a predefined angle to take advantage of the Coreolis force and thus enables a smoother and more uniform flow and distribution of the first and second materials.

While the apparatus of the present invention is shown with one holding arm in FIGS. 1A to 3, it should be understood to one skilled in the art, that the inventive apparatus may be advantageously constructed with a plurality of holding arms to simultaneously fabricate multiple layered periodic structures.

Referring now to FIG. 4, a third exemplary embodiment of the apparatus is shown as an apparatus 50. The apparatus 50 includes a drive unit 52, for example a motor capable of operation over a wide RPM range, for driving a shaft 54. The shaft 54 is connected to a receiving vessel 56 with a central cavity for receiving materials. A first curved holding arm 58 with a shallow channel 60 connects the receiving vessel 56 cavity to a substrate support 62. The substrate support 62 is configured for holding a substrate 64 upon which the periodic layers are to be deposited during the operation of the apparatus 50. A second curved holding arm 66 with a shallow channel 68 connects the receiving vessel 56 cavity to a substrate support 70. The substrate support 70 is configured for holding a substrate 72 upon which the periodic layers are to be deposited during the operation of the apparatus 50.

The receiving vessel 56, the channels 60 and 68 and the substrate supports 62 and 70, are configured such that when the drive unit 52 is activated and the shaft 54 begins rotation, a first material is deposited into the receiving vessel 56 and then driven, by the centrifugal force caused by the shaft 54 rotation, through the channels 60 and 68 onto the substrate supports 62 and 70. The centrifugal force causes the first material to easily and uniformly coat the respective substrates 64, 72. Optionally, the receiving vessel 56 is configured with two separate receiving areas (not shown), where each receiving area communicates with one of the channels 60 and 68, such that the materials for each of the substrates 64 and 72, is delivered into the respective receiving areas and are conducted to the substrates separately.

After the first material has been deposited to form the first layer on each substrate 64 and 72, a second material is directed into the receiving vessel 56 and flows through the channels 60 and 68 onto the respective substrates 64 and 72 to form a second layer over the layer formed by the first material. The curved shape of the holding arms 58 and 66, delivers the materials to the respective substrates 64 and 72 at a predefined angle and thus enables a smoother and more uniform distribution of the first and second materials.

Figure 5:
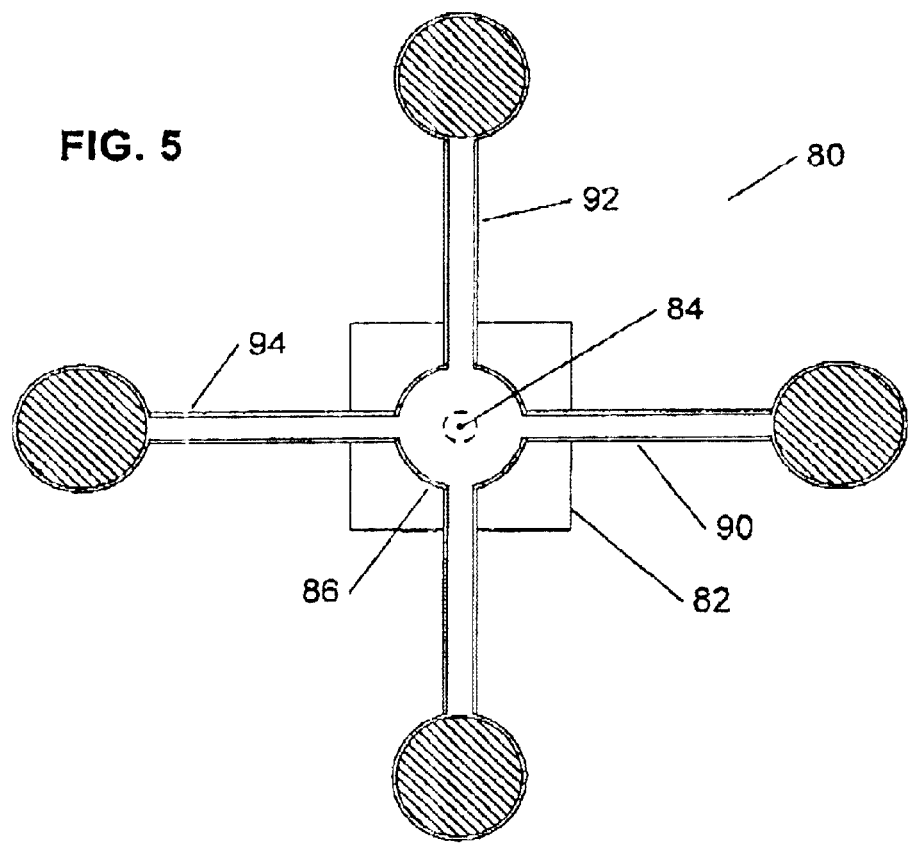
FIG. 5 is a schematic diagram of a top view of a fourth embodiment of the thin layered periodic media fabrication apparatus of the present invention.

Referring now to FIG. 5, a fourth exemplary embodiment of the apparatus is shown as an apparatus 80. Similarly to previously described embodiments of the inventive apparatus 10, the apparatus 80 includes a drive unit 82, a drive shaft 84 and a receiving vessel 86. The apparatus 80 includes four holding arms 88, 90, 92 and 94 with respective channels leading to substrate supports and substrates, such that when the materials are delivered into the receiving vessel 86 during the operation of the apparatus 80, they are evenly distributed to the individual substrates by the centrifugal force.

Figure 6A:
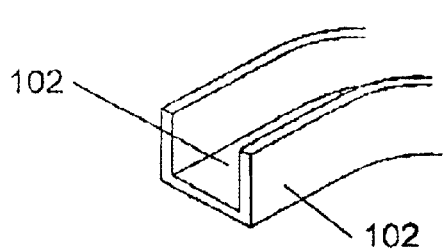
FIG. 6A is a schematic diagram of an isometric view of a first embodiment of a connecting channel arm of the apparatus of FIGS. 3 and 4.

The cross section shape of the channels shown in the previously described embodiments of the present invention may be selected as a matter of design choice to facilitate unobstructed flow of materials from the receiving vessel to the substrate surface. Furthermore, the surface of the channels may be coated with a low friction material. An exemplary holding arm 100 with a channel 102 is shown in FIG. 6A. Alternately, each holding arm may have two channels, one for the first material and one for the second material. In this case, the receiving area of the inventive apparatus must be split into separate portions for each of the materials such that the first material is introduced into the first receiving portion that communicates with the first channel of each holding arm, while the second material is delivered into the second receiving portion which communicates with the second channel of each holding arm (not shown).

Figure 6B:
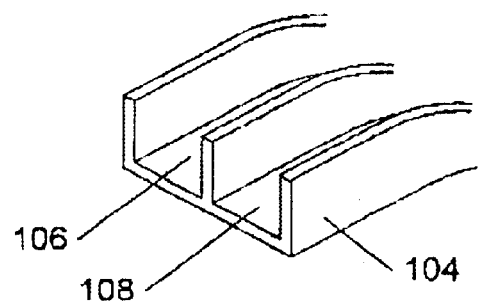
FIG. 6B is a schematic diagram of an isometric view of a second embodiment of a connecting channel arm of the apparatus of FIGS. 3 and 4.

Referring now to FIG. 6B, an exemplary two channel holding arm 104 is shown with two channels 106 and 108, respectively. The channel arm 104 configuration is particularly useful in a situation where the first and second materials are capable of interacting with one another and the layers are polymerized to prevent interaction therebetween. In this case keeping the first and second material delivery in separate channels is advantageous to prevent the materials from mixing in the channel during successive deposition cycles.

Figure 7A:
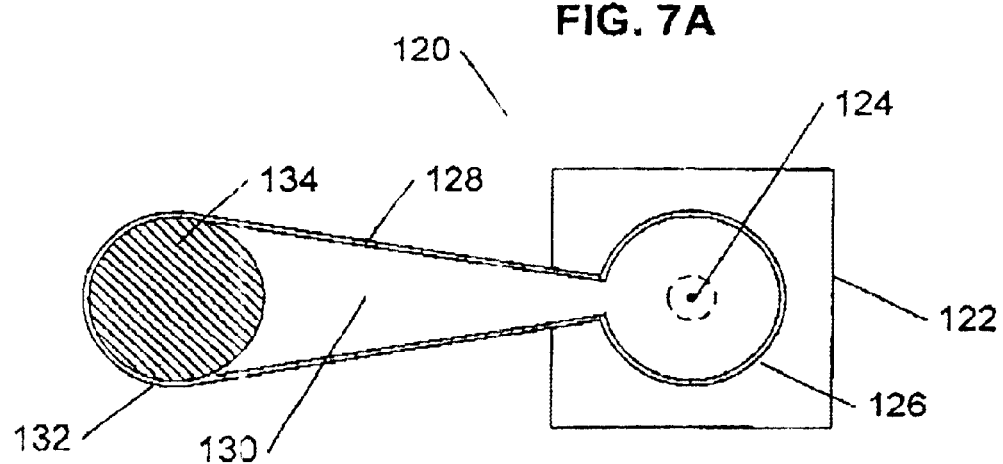
FIG. 7A is a schematic diagram of a top view of a fifth embodiment of the thin layered periodic media fabrication apparatus of the present invention.
Figure 7B:
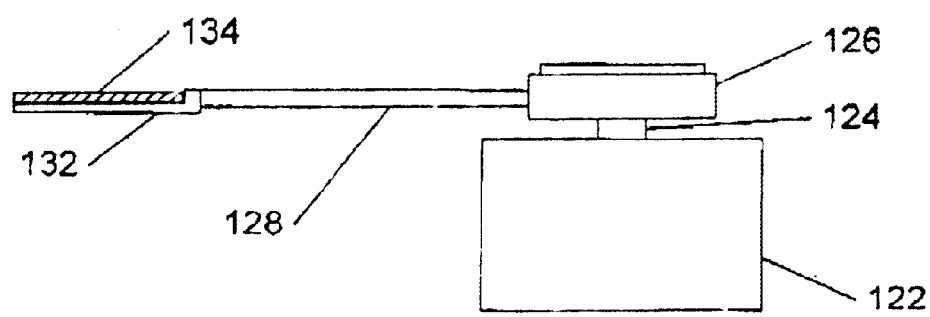
FIG. 7B is a schematic diagram of a side view of the fifth embodiment of the thin layered periodic media fabrication apparatus of the present invention.

Referring now to FIGS. 7A and 7B, a fifth exemplary embodiment of the apparatus 10 is shown as an apparatus 120. The apparatus 120 includes a drive unit 122, for example a motor capable of operation over a wide RPM range, for driving a shaft 124. The shaft 124 is connected to a receiving vessel 126 with a central cavity for receiving materials. A holding arm 128 with a shallow channel 130 connects the receiving vessel 126 cavity to a substrate support 132.

The substrate support 132 is configured for holding a substrate 134 upon which the periodic layers are to be deposited during the operation of the apparatus 120. The channel 130 is configured so as to increase in width from its connection to the receiving vessel 126 until it reaches the width of the substrate 134. The receiving vessel 136, the channel 130 and the substrate support 132 are further configured such that when the drive unit 122 is activated and the shaft 124 begins rotation, a first material deposited into the receiving vessel 126 is driven, by the centrifugal force caused by the shaft 124 rotation, through the channel 130 onto the substrate 134. The centrifugal force causes the first material to easily and uniformly coat the substrate 134. The width of the channel 130 at its point of contact with the substrate 124 ensures that the entire surface of the substrate 134 is uniformly covered with the material. Furthermore, unlike the material support 22 of FIGS. 1A and 1B, the material support 132 does not have a border around the substrate 134. While this arrangement results in a waste of a portion of the material, as the centrifugal force causes the material to flow over the substrate 134 and escape, the advantage gained is that a thinner material layer over the substrate 134 may be obtained. This is due to the fact that the lack of a border around the substrate 134 prevents the material from pooling and thus enables thinner layers to be achieved.

After the first material has been deposited to form the first layer, a second material is directed into the receiving vessel 126 and flows through the channel 130 onto the substrate 134 to form a second layer over the layer formed by the first material. The process may then be repeated by depositing another layer of the first material, or alternately, a third material may be used as desired. Preferably, the materials are delivered to the receiving vessel 126 when the apparatus 120 is in operation. However, as a matter of design choice, the materials may be delivered to the receiving vessel 126 when apparatus is at a stopped mode.

Figure 8:
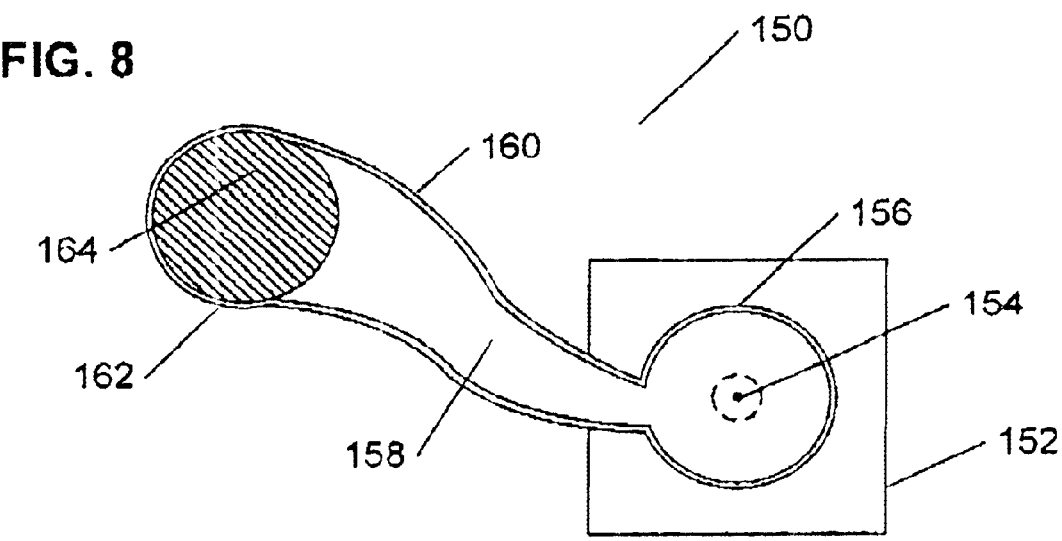
FIG. 8 is a schematic diagram of a top view of a sixth embodiment of the thin layered periodic media fabrication apparatus of the present invention.

Referring now to FIG. 8, a sixth exemplary embodiment of the apparatus is shown as an apparatus 150. The apparatus 150 includes a drive unit 152, for example a motor capable of operation over a wide RPM range, for driving a shaft 154. The shaft 154 is connected to a receiving vessel 156 with a central cavity for receiving materials. A curved holding arm 158 with a shallow channel 160 connects the receiving vessel 156 cavity to a substrate support 162.

The substrate support 162 is configured for holding a substrate 164 upon which the periodic layers are to be deposited during the operation of the apparatus 150. The curved channel 160 is configured so as to increase in width from its connection to the receiving vessel 156 until it reaches the width of the substrate 164. The receiving vessel 156, the channel 160 and the substrate support 162 are further configured such that when the drive unit 152 is activated and the shaft 154 begins rotation, a first material deposited into the receiving vessel 156 is driven, by the centrifugal force caused by the shaft 154 rotation, through the channel 160 onto the substrate 164. The centrifugal force causes the first material to easily and uniformly coat the substrate 164. The width of the channel 160 at its point of contact with the substrate 154 ensures that the entire surface of the substrate 164 is uniformly covered with the material. Furthermore, unlike the material support 22 of FIGS. 1A and 1B, the material support 162 does not have a border around the substrate 164. While this arrangement results in waste of a portion of the material as the centrifugal force causes the material to flow over the substrate 164 and escape, the advantage gained is that a thinner material layer over the substrate 164 may be obtained. This is due to the fact that the lack of a border around the substrate 164 prevents the material from pooling and thus enables thinner layers to be achieved.

After the first material has been deposited to form the first layer, a second material is directed into the receiving vessel 156 and flows through the channel 160 onto the substrate 164 to form a second layer over the layer formed by the first material. The process may then be repeated by depositing another layer of the first material, or alternately, a third material may be used as desired. Preferably, the materials are delivered to the receiving vessel 156 when the apparatus 160 is in operation. However, as a matter of design choice, the materials may be delivered to the receiving vessel 166 when apparatus is at a stopped mode. The curved shape of the holding arm 158 delivers the materials to the substrate 164 at a predefined angle and thus enables a smoother and more uniform distribution of the first and second materials across the surface of the substrate 164.

Figure 9:
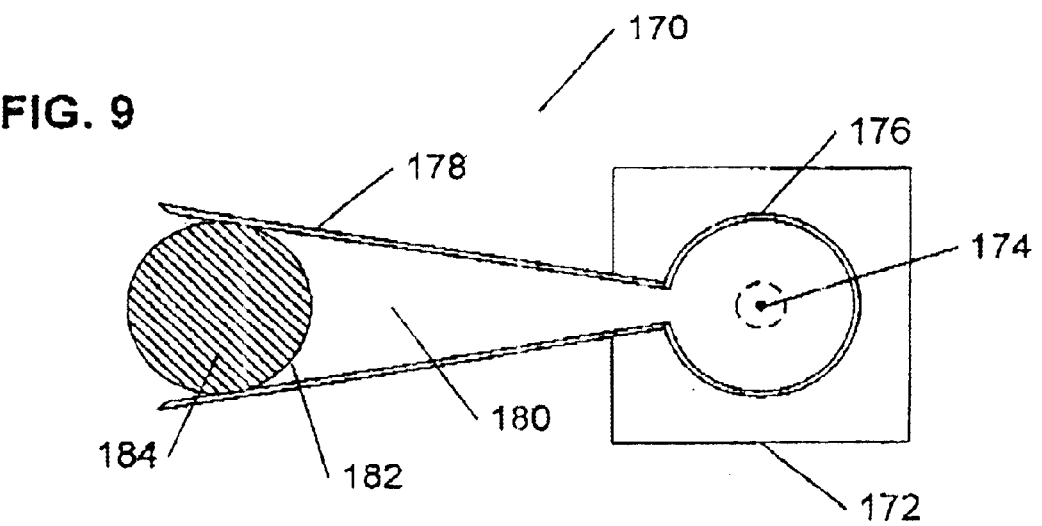
FIG. 9 is a schematic diagram of a top view of a seventh embodiment of the thin layered periodic media fabrication apparatus of the present invention.

Referring now to FIG. 9, a seventh exemplary embodiment of the apparatus 10 is shown as an apparatus 170. The apparatus 170 includes a drive unit 172, for example a motor capable of operation over a wide RPM range, for driving a shaft 174. The shaft 174 is connected to a receiving vessel 176 with a central cavity for receiving materials. A holding arm 178 with a shallow channel 180 connects the receiving vessel 176 cavity to a substrate support 182.

The substrate support 182 is configured for holding a substrate 184 upon which the periodic layers are to be deposited during the operation of the apparatus 170. The channel 180 is configured so as to increase in width from its connection to the receiving vessel 176 until it exceeds the width of the substrate 184. The receiving vessel 176, the channel 180, and the substrate support 182, are further configured such that when the drive unit 172 is activated and the shaft 174 begins rotation, a first material deposited into the receiving vessel 176 is driven, by the centrifugal force caused by the shaft 174 rotation, through the channel 180 onto the substrate 184. The centrifugal force causes the first material to easily and uniformly coat the substrate 184. The fact that the width of the channel 180 at its point of contact with the substrate 174 exceeds the width of the substrate 174, ensures that the entire surface of the substrate 184 is uniformly covered with the material. While this arrangement results in waste of a portion of the material as the centrifugal force causes the material to flow over and around the substrate 184 and escape, the advantage gained is that a thinner material layer over the substrate 184 may be obtained. This is due to the fact that (1) the lack of a border around the substrate 184 prevents the material from pooling and thus enables thinner layers to be achieved, and (2) having a material flow through the channel 180 over an area greater that the width of the substrate 184 enables full coverage of even the portions of the substrate 184 around its edges.

After the first material has been deposited to form the first layer, a second material is directed into the receiving vessel 176 and flows through the channel 180 onto the substrate 184 to form a second layer over the layer formed by the first material. The process may then be repeated by depositing another layer of the first material, or alternately, a third material may be used as desired. Preferably, the materials are delivered to the receiving vessel 176 when the apparatus 170 is in operation. However, as a matter of design choice, the materials may be delivered to the receiving vessel 176 when apparatus is at a stopped mode.

Figure 10:
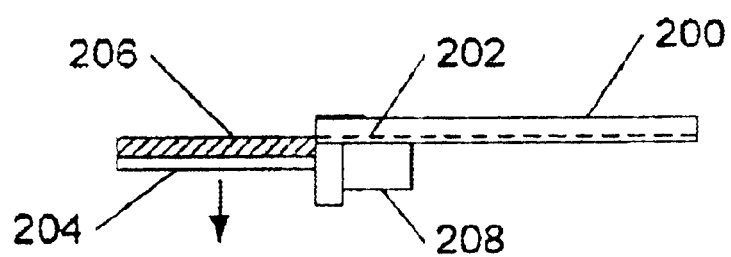
FIG. 10 is a schematic diagram of a top view of a first alternate embodiment of a substrate support of the thin layered periodic media fabrication apparatus of the present invention.

While the surface of the substrate is shown to be aligned with the bottom of the holding arm channel in previously described embodiments of FIGS. 1A to 9, the position of the substrate surface relative to the bottom of the holding arm channel may be selected as a matter of design choice to facilitate flow of multiple material layers from the receiving vessel to the substrate surface. The position of the substrate surface becomes particularly important when multiple material layers are deposited thereon. To prevent the height of the deposited layers from exceeding the bottom of the holding arm channel surface, it would be advantageous to lower the substrate after one or more material layers have been deposited thereon. An exemplary lowering mechanism is shown in FIG. 10. Referring to FIG. 10, a holding arm 200 with a channel bottom 202 delivers materials to the surface of a substrate 206 supported by the substrate support 204. A substrate position adjustment unit 208 enables the substrate support 204 to be lowered by a desired distance after one or more layers of materials are deposited onto the substrate 206 to ensure that the height of the highest layer of materials is aligned with the channel bottom 202.

Figure 11:
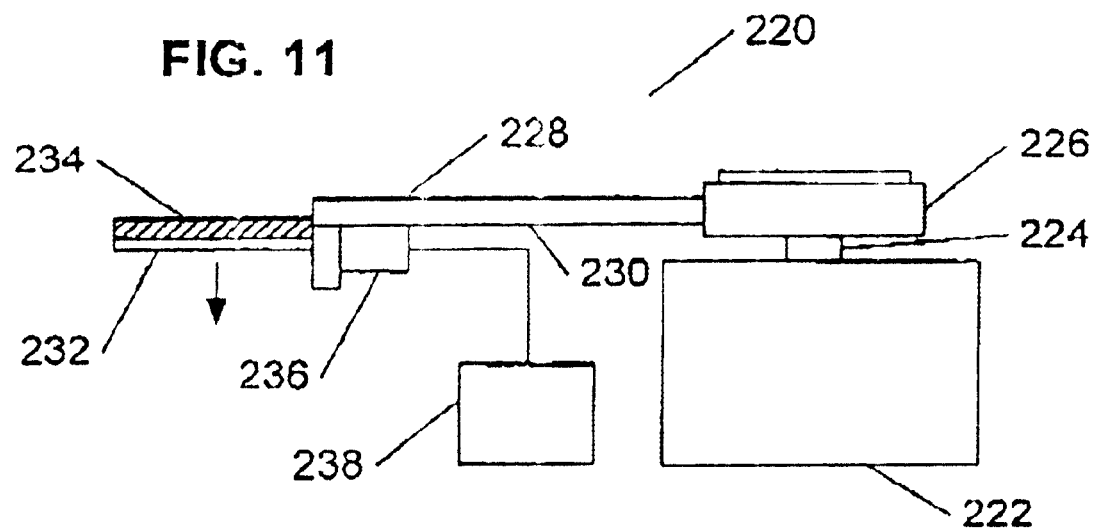
FIG. 11 is a schematic diagram of a top view of a second alternate embodiment of the substrate support of the thin layered periodic media fabrication apparatus of the present invention.

Alternately, the lowering mechanism may be automated as shown in FIG. 11. Referring now to FIG. 11, an apparatus 220 of the present invention is shown. The apparatus 220 includes a drive unit 222 for driving a shaft 224. The shaft 224 is connected to a receiving vessel 226 with a central cavity for receiving materials. A holding arm 228 with a shallow channel 230 connects the receiving vessel 226 cavity to a movable substrate support 232. The substrate support 232 is configured for holding a substrate 234 upon which the periodic layers are to be deposited during the operation of the apparatus 220. A position adjustment unit 236 is connected to the substrate support 232 and enables the substrate support 232 to be incrementally raised and lowered. A position controller 238, such as a microprocessor, is connected to the position adjustment unit 236 and to the drive unit 222 and material dispenser (not shown). The position controller 238 is preferably configured to automatically lower the substrate support 232 after each layer of material is deposited on the substrate 234 such that the surface of the substrate 234 (along with the layered materials) is aligned with the bottom of channel 230. Alternately, when the material layers are very thin, the position controller 238 may lower the substrate support 232 after two or more layers have been deposited.

The inventive fabrication apparatus 10 may be configured, in an alternate embodiment of the present invention, for fabricating chiral media. Chiral media is utilized in a variety of applications such as disclosed in commonly assigned above-incorporated U.S. Pat. No. 6,404, 789.

Figure 12A:
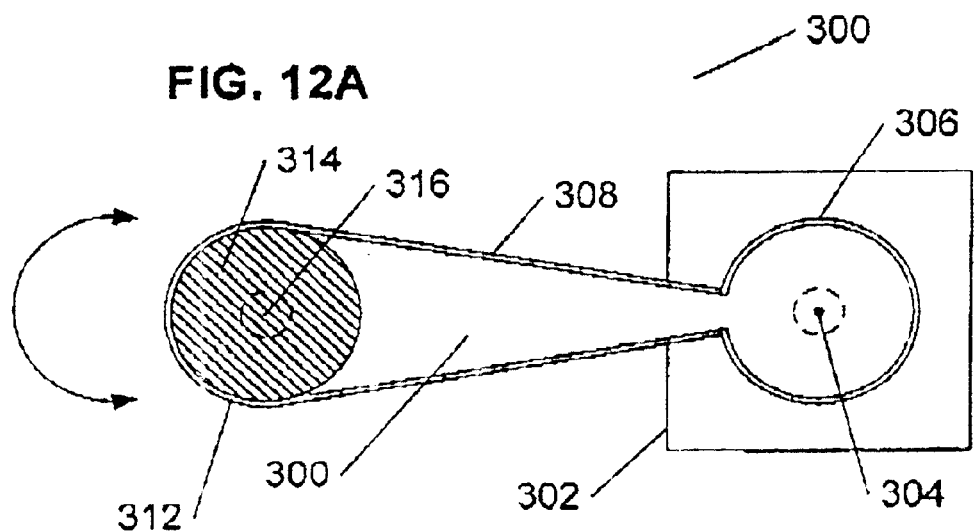
FIG. 12A is a schematic diagram of a top view of an alternate embodiment of the inventive fabrication apparatus of FIGS. 1A to 1B, configured for fabricating chiral media.
Figure 12B:
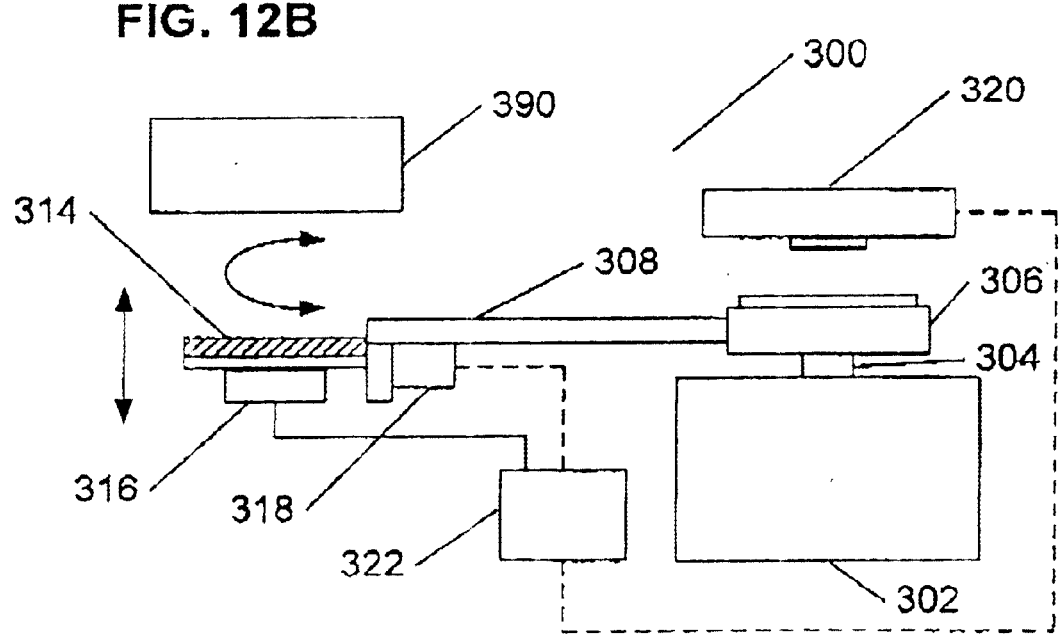
FIG. 12B is a schematic diagram of a side view of the inventive chiral media fabrication apparatus of FIG. 12A.

Referring to FIGS. 12A and 12B, an alternate embodiment of the fabrication apparatus 10 of the present invention is shown as an apparatus 300. The apparatus 300 includes a drive unit 302, for example a motor capable of operation over a wide RPM range, for driving a shaft 304. The shaft 304 is connected to a receiving vessel 306 with a central cavity for receiving materials to be used for layering. A holding arm 308 with a shallow channel 310 connects the receiving vessel 306 cavity to a substrate support 312. The shape and cross-section of the holding arm 308 may be selected as a matter of design choice. For example, various holding arm configurations of the embodiments of FIGS. 3 to 11 may be advantageously utilized. While the apparatus 300 of the present invention is shown with one holding arm in FIGS. 12A and 12B, it should be understood to one skilled in the art, that the inventive apparatus 300 may be advantageously constructed with a plurality of holding arms to simultaneously fabricate multiple chiral structures without departing from the spirit of the invention (for example utilizing the holding arm arrangements of FIGS. 4 and 5.

The substrate support 312 is configured for holding a substrate 314 upon which the periodic layers are to be deposited during the operation of the apparatus 300. A rotating unit 316, for circumferentially rotating the substrate 314 at a predefined angle or rotation via the substrate support 312 or otherwise, is connected to the substrate support 312. An optional position adjustment unit 318 is connected to the substrate support 312, and enables the substrate support 312 to be incrementally raised and lowered. An optional material dispenser 320 is positioned over the receiving vessel 306 for dispensing the material to be used for fabricating the desired chiral substance. Alternately, the materials may be measured and dispensed manually. A control unit 322 for controlling the operation of the apparatus 300 is connected to the the drive unit 302, the rotating unit 316, the position adjustment unit 318, and the material dispenser 320.

In accordance with the present invention, the substrate 314 may be constructed of a variety of materials such as glass, ITO (indium thin oxide), silicon or a polymer substance. The material utilized in accordance with the present invention is preferably anisotropic—i.e. having molecular direction determined by the flow of the material and by forces exerted on the material. An example of such a material is a liquid crystal solution. Alternately, the material may also incorporate photo-initiators, emitting substances (such as dyes or rare earths), and can have properties of electro-luminescence and conductivity.

The apparatus 300 preferably operates as follows. The control unit 322 activates the drive unit 302 to cause the shaft 304 to rotate and cause a centrifugal force to be exerted in the direction of the substrate 314. The control unit 322 then activates the material dispenser 320 to dispense the material into the receiving vessel 306. The centrifugal force causes the material to flow through the channel 310 to coat the substrate 314 in a first layer. Because of the anisotropic nature of the material, the centrifugal force also causes the material's molecules to be aligned in the direction parallel to the exerted force. This molecular directionality is shown in FIG. 12A.

Figure 13A:
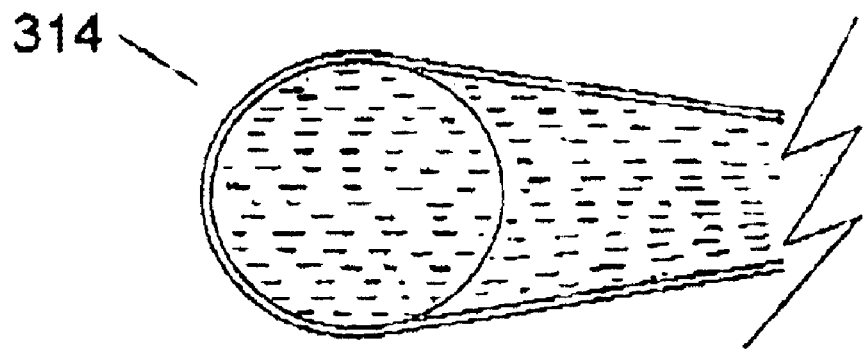
FIG. 13A is a schematic diagram of a top view of a single layer coated substrate of the chiral media fabrication apparatus of FIGS. 12A to 12B.
Figure 13B:
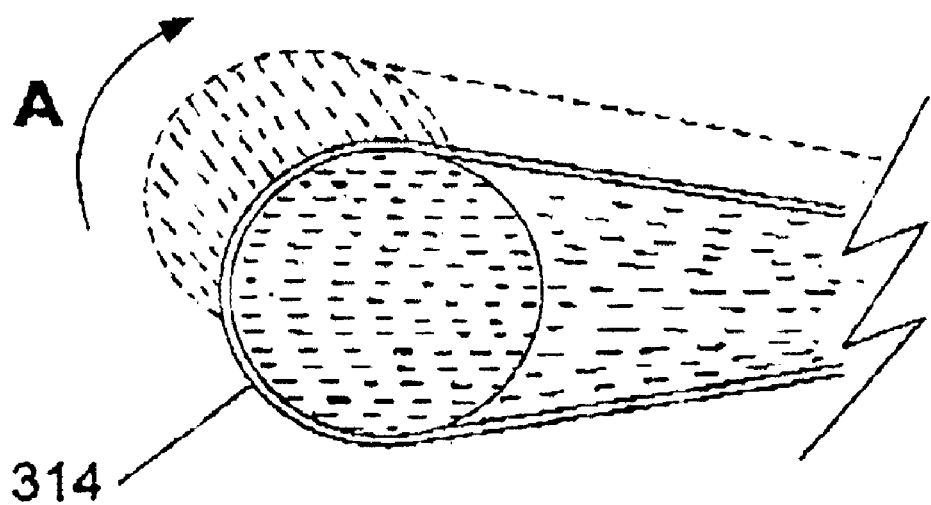
FIG. 13B is a schematic diagram of an expanded top view of a two layer coated substrate of the chiral media fabrication apparatus of FIGS. 12A to 12B.

After the first layer is deposited, the material is subjected to polymerization to prevent it from mixing and interacting with future material layers. Preferably, polymerization is accomplished under direction of the control unit 322. Polymerization may be accomplished in a variety of ways known in the art such as via ultraviolet irradiation (the polymerizing device 390 is shown). The control unit 322 then causes the rotating unit 316 to circumferentially rotate the substrate 314 by a predefined angle A, and then repeats activation of the material dispenser 320 to cause another quantity of the material to be dispensed into the receiving vessel 306. The material flows to form a second layer on the substrate 314, the molecules arranged in the direction of the flow. The angular shift and the change in molecular directionality between layers is shown in FIG. 13B. This process of rotating the substrate 314 after depositing each layer continues until the desired number of layers is achieved. Because the substrate 314 is rotated after each layer is deposited, the direction of the molecules on each layer differs from the previous layer by angle A. In essence, the layered structure formed by the inventive apparatus 300 mimics a true chiral structure, such as a cholesteric liquid crystal.

To maintain the top layer of the layered structure on the substrate 314 aligned with the bottom of the channel 310, the control unit 322 causes the position adjustment unit 318 to automatically lower the substrate support 312 after each layer is deposited. Alternately, when the material layers are very thin, the position adjustment unit 318 may lower the substrate support 312 after two or more layers have been deposited.

In an alternate embodiment of the present invention instead of using the same material for all layers, a first and a second different materials may be utilized for alternating layers. Preferably, the first and second materials are anisotropic and have similar properties while being insoluble with one another. Thus, successive alternating layers of the first and second material may be deposited without needing to polymerize each layer before the next layer is formed. If the materials used are capable of interacting with one another, each layer is preferably subjected to polymerization via polymerization device (not shown), preferably under direction of the control unit 322, before the next layer is deposited.

Figure 14A:
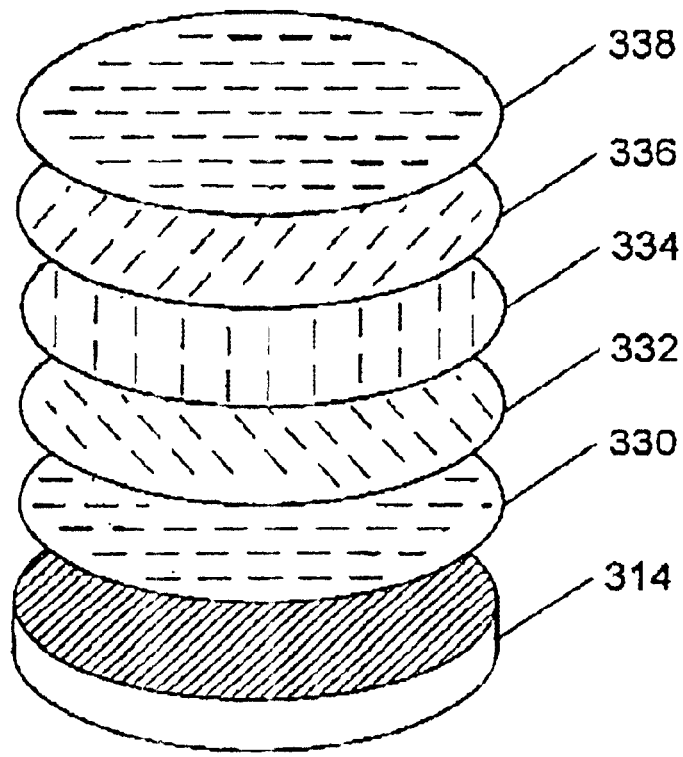
FIG. 14A is a diagram of an isometric view of a first embodiment of a multi-layer coated substrate fabricated in accordance with the chiral media fabrication apparatus of FIGS. 12A to 12B.
Figure 14B:
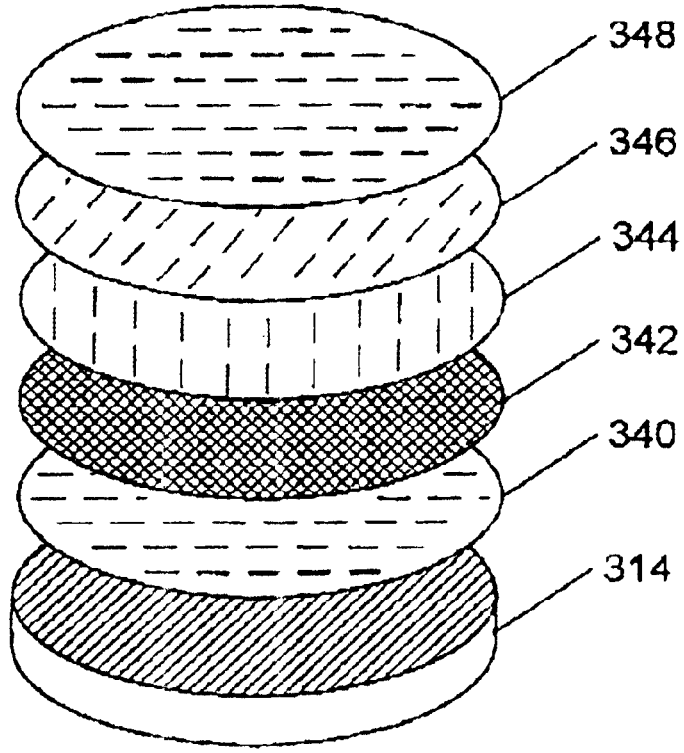
FIG. 14B is a diagram of an isometric view of a second embodiment of a multi-layer coated substrate fabricated in accordance with the chiral media fabrication apparatus of FIGS. 12A to 12B.

In addition to ordinary chiral structures, chiral structures incorporating a defect may be constructed in accordance with the present invention. Referring now to FIGS. 14A to 14D, several embodiments of the chiral structures formed in accordance with the present invention are shown. In FIG. 14A, a standard chiral structure is shown where the direction of the molecules changes by angle A from layer to layer. The five layers 330 to 338 are shown by way of example only as chiral structures fabricated in accordance with the present invention may include many more layers. In FIG. 14B, a first embodiment of chiral structure incorporating a defect is shown. While layers 340, 342, 346, and 348 are of an anisotropic material, a defect layer 344 is formed when the control unit 332 causes the material dispenser 320 to dispense a defect material after layer 344 is formed and polymerized. Furthermore, the substrate 314 is not rotated after the defect layer is deposited, so that the difference between the molecular direction of layers 342 and 346 is equal to angle A. The defect material may be selected as a matter of design choice and may include electro-luminescent or optically active properties.

Figure 14C:
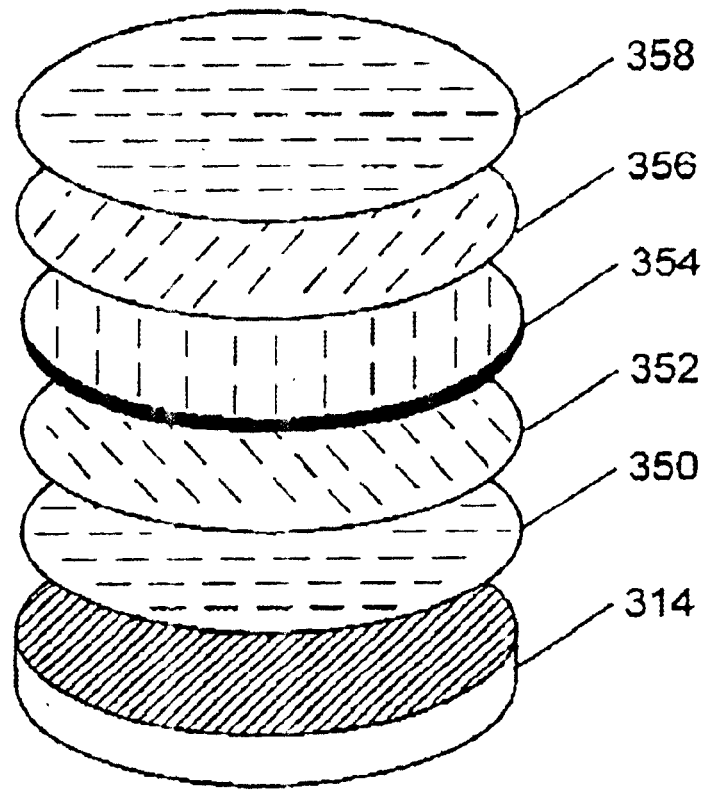
FIG. 14C is a diagram of an isometric view of a third embodiment of a multi-layer coated substrate fabricated in accordance with the chiral media fabrication apparatus of FIGS. 12A to 12B.

In FIG. 14C, a second embodiment of chiral structure incorporating a defect is shown. While all layers 350 to 358 are of an anisotropic material, the defect layer 354 is thicker than the other layers 350, 352 and 356, 358. The defect layer 354 is formed in one of two approaches. In the first approach, the control unit 322 causes the material dispenser 320 to dispense one or more additional layers on the layer 354 without rotating the substrate 314—thus causing layer to be composed of several layers with the same molecular direction, essentially making it thicker than other layers without affecting the molecular directionality from layer to layer. In the second approach, the control system 322 causes the speed of the drive unit 302 to change when the layer 354 is being deposited to cause a thicker deposit, and return to its normal speed after layer 354 is polymerized.

Figure 14D:
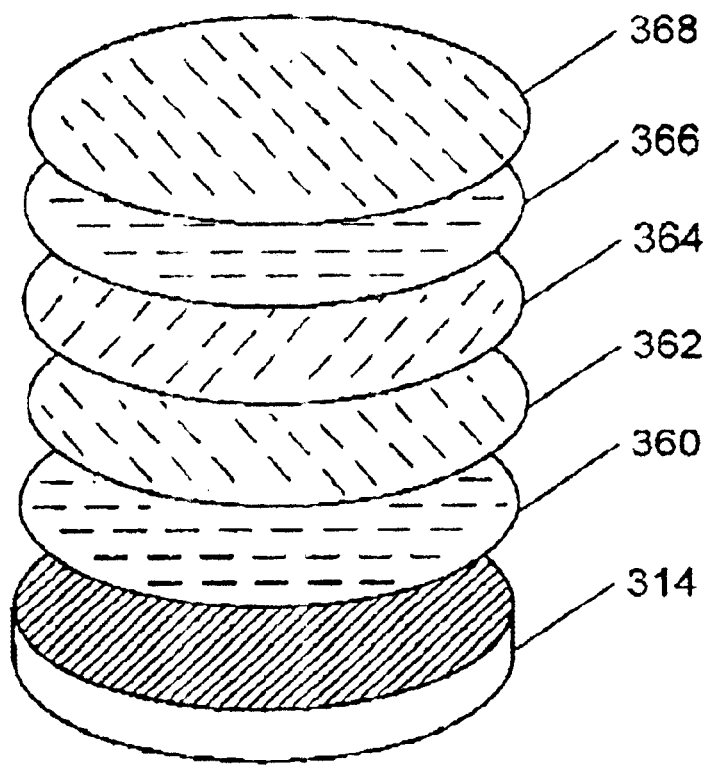
FIG. 14D is a diagram of an isometric view of a fourth embodiment of a multi-layer coated substrate fabricated in accordance with the chiral media fabrication apparatus of FIGS. 12A to 12B.

In FIG. 14D, a third embodiment of chiral structure incorporating a defect is shown. While all layers 360 to 368 are of an anisotropic material, the angle of molecular direction between layers 362 and 364 is different from A. This type of defect may be referred to the "chiral twist defect" and is described in greater detail in a commonly assigned U.S. Pat. No. 6,396,859 entitled "CHIRAL TWIST LASER AND FILTER APPARATUS AND METHOD" which is hereby incorporated herein in its entirety. The chiral twist defect between two layers may be accomplished by the control unit 322 changing the angle A of substrate rotation between two layers.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apparatus for fabricating a layered periodic structure from thin uniform alternating layers of a first and a second material on a substrate, comprising:
   a receiving vessel having a central axis and configured to receive the first and the second materials therein;
   a substrate mount for retaining the substrate;
   a holding member, connecting a side of said receiving vessel to a side of said substrate mount, having a longitudinal axis and having a channel along said longitudinal axis configured to enable the first and the second material to flow from said receiving vessel to an upper surface of the substrate;
   a position adjustment unit connected to said substrate mount and to said holding member, operable to incrementally move said substrate mount along a vertical axis to maintain said upper surface of the substrate aligned with said channel;
   a driving unit connected to said receiving vessel for rotating said receiving vessel at a predetermined speed about said central axis; and
   material delivery means for:
   (a) delivering the first material to said receiving vessel when said driving unit is activated, such that centrifugal force causes the first material to flow from said receiving vessel to said upper surface of the substrate to form a uniform first layer,
   (b) delivering the second material to said receiving vessel when said driving unit is activated, such that centrifugal force causes the second material to flow from said receiving vessel to said upper surface of the substrate to form a uniform second layer over the first material, and
   (c) repeating delivery of the first and the second materials until a predetermined number of alternating first and second material layers are formed on said substrate upper surface thus fabricating a layered periodic structure.

2. The apparatus of claim 1, wherein the first and the second materials are selected such that they cannot mix with or dissolve one another.

3. The apparatus of claim 1, wherein said holding member is a plurality of said holding members, wherein said substrate mount is a plurality of said substrate mounts, wherein the substrate is a plurality of the substrates, wherein said channel within each said holding member being connected to said receiving vessel and to a respective one of said plurality of said substrate mounts each holding one of the plurality of substrates, sequentially delivered to each one of the plurality of substrates such that the layered periodic structures are thus formed.

4. The apparatus of claim 3, wherein each one of said plurality of holding members is curved and wherein a first end of each one of said plurality of holding arms connects to said receiving vessel at a first angle and wherein said second end of each one of said plurality of holding members connects to one of said plurality of substrate mounts at a second angle.

5. The apparatus of claim 1, wherein said holding member is substantially curved and wherein a first end of said holding member connects to said receiving vessel at a first angle, and wherein said second end of a holding member connects to said substrate mount at a second angle.

6. The apparatus of claim 1, further comprising a control unit connected to said driving unit and to said material delivery means, operable to control operation of said driving unit and said material delivery means.

7. The apparatus of claim 1, wherein said holding member channel further comprises:
  a first end connected to said receiving vessel; and
  a second end connected to said substrate mount, said second end having a width equal to or greater than said substrate, wherein said second end is wider than said first end.

8. The apparatus of claim 1, further comprising:
  a position control unit connected to said position adjustment unit and to said material delivery means, operable to:
    (a) automatically control a vertical position of said substrate mount in response to material delivery by said material delivery means, such that after said material delivery means delivers a predetermined number of material layers to the substrate, said position control unit causes said position adjustment unit to lower the substrate so that an upper material layer of the substrate is kept substantially aligned with said channel; and
    (b) after the substrate is removed, and a new substrate added, returning the new substrate to an initial position where said new substrate surface is aligned with said channel.

9. An apparatus for fabricating a chiral structure from thin uniform layers of an anisotropic material on a substrate, comprising:
  a receiving vessel configured to receive the anisotropic material therein;
  a substrate mount for retaining the substrate;
  a holding member, connecting a side of said receiving vessel to a side of said substrate mount, having a longitudinal axis and having a channel along said longitudinal axis, configured to enable the anisotropic material to flow from said receiving vessel to an upper surface of the substrate;
  a driving unit connected to said receiving vessel operable to rotate said receiving vessel at a predetermined speed about its central axis;
  material dispenser means positioned over said receiving vessel operable to dispense the anisotropic material into said receiving vessel;
  substrate rotating means, connected to said substrate mount, operable to rotate said substrate by a predefined circumferential angle; and
  control for:
    (a) activating said drive unit and causing said material dispenser means to deliver the anisotropic material to said receiving vessel, such that centrifugal force causes the anisotropic material to flow from said receiving vessel to said upper surface of the substrate to form a uniform first layer having molecular alignment in a direction of the centrifugal force,
    (b) causing said substrate rotating means to rotate said substrate by said predetermined circumferential angle; and
    (c) repeating a cycle of delivery of said anisotropic material and angular rotation between formation of each layer until a predetermined number of plural layers are formed on said substrate upper surface thus forming a chiral structure.

10. The apparatus of claim 9, wherein said holding member channel further comprises:
  a first end connected to said receiving vessel; and
  a second end connected to said substrate mount, said second end having a width equal to or greater than said substrate, wherein said second end is wider than said first end.

11. The apparatus of claim 9, further comprising:
  a position adjustment unit, connected to said substrate mount and to said holding member, operable to incrementally move said substrate mount along a vertical axis to maintain said upper surface of the substrate aligned with said channel.

12. The apparatus of claim 11, wherein said control unit is further operable to:
  (d) automatically control a vertical position of said substrate mount in response to material delivery by said material dispenser means, such that after a predetermined number of anisotropic material layers are formed on the substrate, said position adjustment unit lowers the substrate so that an upper material layer of the substrate is kept substantially aligned with said channel; and
  (e) after the substrate is removed, and a new substrate added, returning the new substrate to an initial position where said new substrate surface is aligned with said channel.

13. The apparatus of claim 9, wherein said control unit is further operable to:
  (f) cause said material dispenser means to dispense a defect material after a predetermined number of anisotropic material layers have been formed on the substrate, and thereafter cause said material dispenser means to continue to dispense the anisotropic material, such that a defect layer is formed as one of said plural layers.

14. The apparatus of claim 9, wherein said control unit is further operable to:
  (g) after a predetermined number of anisotropic material layers have been formed on the substrate, set said predetermined angle to zero for at least one cycle of formation of said anisotropic material layers to form a defect layer thicker than other plural anisotropic material layers, and thereafter repeating the previous cycles of layer formation.

15. The apparatus of claim 9, wherein said control unit is further operable to:
  (h) after a predetermined number of anisotropic material layers have been formed on the substrate, set said predetermined angle to a different value for one cycle of formation of said anisotropic material layers to form a defect layer having a different molecular direction angle from all other plural layers, and thereafter returning said predetermined angle to its previous value and repeating the previous cycles of layer formation.

16. The apparatus of claim 9, further comprising polymerization means for polymerizing the anisotropic material, wherein said control unit activates said polymerization means after each anisotropic material layer is formed.

* * * * *